United States Patent [19]

Takahashi et al.

[11] Patent Number: 4,713,613
[45] Date of Patent: Dec. 15, 1987

[54] DEVICE FOR MAGNETICALLY DETECTING DISPLACEMENT OF NON-MAGNETIC MOVABLE MEMBER

[75] Inventors: Tadashi Takahashi; Kunio Miyashita; Syooichi Kawamata, all of Hitachi, Japan

[73] Assignee: Hitachi, Ltd., Tokyo, Japan

[21] Appl. No.: 662,013

[22] Filed: Oct. 18, 1984

[30] Foreign Application Priority Data

Oct. 19, 1983 [JP] Japan ................... 58-194164

[51] Int. Cl.⁴ ............... G01B 7/28; G11B 5/39; H01L 43/08
[52] U.S. Cl. ................... 324/208; 324/252; 338/32 R; 360/113
[58] Field of Search ........... 324/207, 208, 228, 226, 324/260-262, 174, 173, 151 R, 252; 338/32 R; 360/113

[56] References Cited

U.S. PATENT DOCUMENTS

| | | | |
|---|---|---|---|
| 3,993,946 | 11/1976 | Makino | 324/208 |
| 4,274,053 | 6/1981 | Ito et al. | 324/151 R X |
| 4,319,188 | 3/1982 | Ito et al. | 324/208 X |
| 4,401,944 | 8/1983 | Narimatsu et al. | 324/207 |
| 4,403,187 | 9/1983 | Takahashi et al. | 324/208 |
| 4,551,676 | 11/1985 | Amemiya et al. | 324/208 |
| 4,589,038 | 5/1986 | Radtke | 324/207 X |
| 4,599,561 | 7/1986 | Takahashi et al. | 324/208 |

FOREIGN PATENT DOCUMENTS 27604  3/1981  Japan .

Primary Examiner—Reinhard J. Eisenzopf
Assistant Examiner—Warren S. Edmonds
Attorney, Agent, or Firm—Antonelli, Terry & Wands

[57] ABSTRACT

A device for magnetically detecting displacement, in which the middle points between the magnetic poles N and S of the magnetic signals recorded in different tracks, which are adjacent to each other, stand on common straight lines perpendicular to the direction of displacement and the direction from N to S of the magnetic signals is always the same, so that the magnetic signals in the different tracks, which are adjacent to each other, are aligned side by side and magnetic leakage between them is prevented.

4 Claims, 10 Drawing Figures

→ PERIPHERAL POSITION
ON THE MAGNETIC RECORDING
MEDIUM FACING TO THE SENSOR

→ PERIPHERAL POSITION
ON THE MAGNETIC RECORDING
MEDIUM FACING TO THE SENSOR

DEVICE FOR MAGNETICALLY DETECTING DISPLACEMENT OF NON-MAGNETIC MOVABLE MEMBER

BACKGROUND OF THE INVENTION

1. Field of the Invention

This invention relates to a device for magnetically detecting the rectilinear displacement or the rotation angle of a subject, and in particular to a magnetic detection device provided with a plurality of magnetic tracks. This device can be applied broadly for detecting the rotation angle of a motor, for detecting the rotational speed, for positioning or speed control for automatic machines as well as for business machines.

2. Description of the Prior Art

A device for magnetically detecting the rotation angle or speed of an electric motor is disclosed in U.S. Pat. No. 4,274,053 (Susumu Ito et al.). According to the invention disclosed in this U.S. patent a magnetic recording medium 4 is mounted on an extremity of the shaft 2 of a rotary body 1 such as a rotor and magnetic signals are recorded therein, as indicated in FIG. 1. A magnetic sensor 6 consisting of a magneto-resistance element made of e.g. permalloy is disposed on a mounting plate 3, interposing a small gap therebetween, whereby the rotation angle of the rotary body 1 is detected as variations in resistance of the magneto-resistance element. In this magnetic detection device, there are problems due to magnetic leakage between different tracks in the magnetic recording medium, in the case where the magnetic recording medium 4 has a plurality of tracks and a multichannel magnetic rotation sensor 6 is used. For example, in the example shown in FIG. 2, magnetic leakage is produced, as indicated by arrows, between a track 4a and another track 4b in the magnetic recording medium 4. By this reason, the tracks 4a and 4b are subjected to mutual magnetic interference and thus it becomes impossible to detect correct signals recorded in each of the tracks.

In order to avoid this drawback, it is also conceivable not to dispose the tracks 4a and 4b so closely, but to locate them, interposing a gap large enough therebetween. However, in this case, this gives rise to another disadvantage that the magnetic recording medium 4 and the magnetic sensor 6 disposed in opposition to it are too large.

SUMMARY OF THE INVENTION

The object of this invention is to provide a magnetic detection device having a small size, which can detect magnetic signals recorded in each track by using magneto-resistance elements without suffering from mutual magnetic interference.

In order to achieve this object mentioned above, according to this invention, the middle points between the magnetic poles S and N recorded in tracks, which are adjacent to each other, in the magnetic recording medium are located on common straight lines which are perpendicular to the direction of the rotation and the direction from N to S is always the same for all the magnetic signals. When magnetic recording is effected in this manner, the same poles of the magnetic signals in the tracks which are adjacent to each other are aligned side by side, and magnetic leakage between different tracks is prevented. Moreover, since there is no magnetic leakage between different tracks at the vicinity of the boundary of each of the tracks, temperature corrections can be easily effected by disposing there a constant resistance and by constructing a three-terminal magneto-resistance element.

DESCRIPTION OF THE PREFERRED EMBODIMENTS

Figure 1:
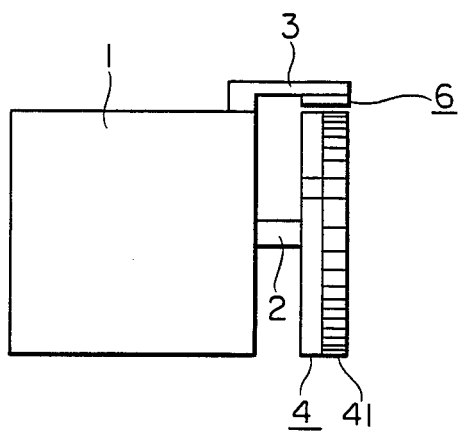
FIG. 1 is a schematical side view of a magnetic rotation sensor.
Figure 2:
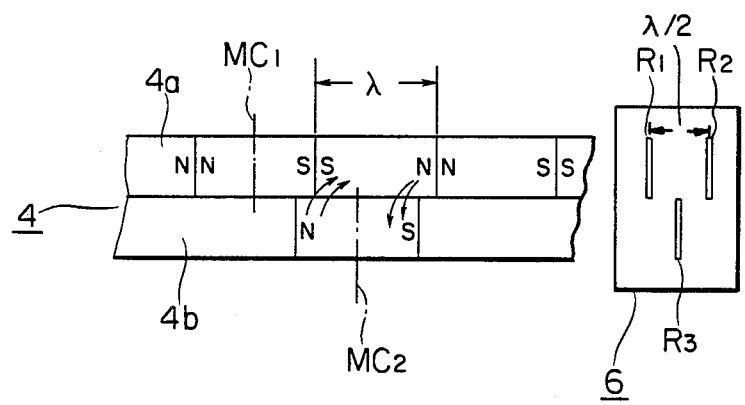
FIG. 2 shows a development of a magnetic rotation sensor and a magnetic recording medium, which have been previously developed.
Figure 3:
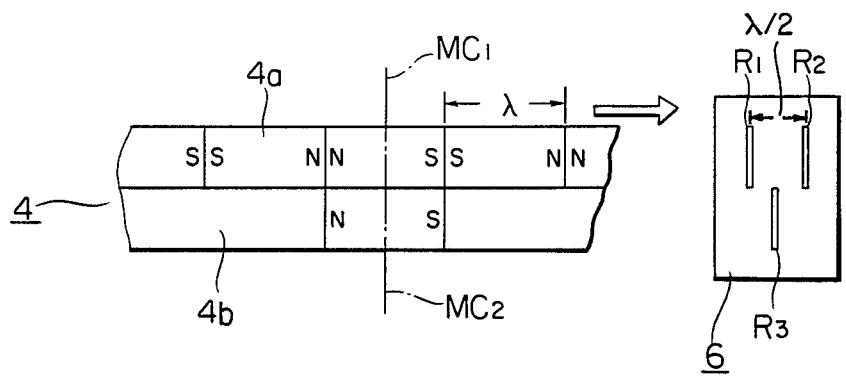
FIG. 3 shows a development of a magnetic rotation sensor and a magnetic recording medium according to an embodiment of this invention.
Figure 4:
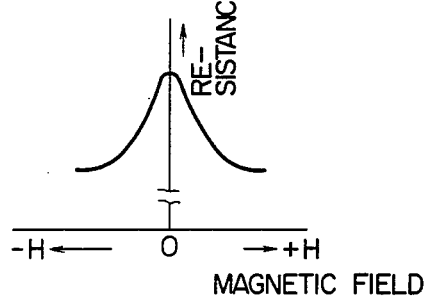
FIG. 4 shows a characteristic curve of a magneto-resistance element.

An embodiment of this invention will be explained, referring to FIG. 1 and FIGS. 3 to 7. FIG. 1 is a scheme showing the construction of a magnetic detection device, in which a non-magnetic plate 41 supporting magnetic recording medium 4 on its surface is mounted on the shaft 2 of a motor 1. Magnetic signals are recorded in the magnetic recording medium 4. A magnetic sensor 6 consisting of magneto-resistance elements is fixed in opposition to this magnetic recording medium 4 to the motor 1 by using a supporter 3, interposing a gap therebetween. The relation between this magnetic recording medium 4 and the magnetic sensor 6 is indicated in FIG. 3 in development. In this embodiment the magnetic recording medium 4 is divided into two tracks 4a and 4b. In the track 4a, magnetic signals are recorded continuously in all around the perimeter. To the contrary, in the reference track 4b are recorded one or several signals in the perimeter. Magnetic recording is so effected that $MC_1$ and $MC_2$, which are the middle points between the poles N and S of magnetic signals recorded in the tracks 4a and 4b, respectively, are aligned in the direction of the rotation axis. Moreover, the poles N and S on the track 4a are juxtaposed with the poles N and S on the adjacent track 4b with the same interval therebetween. The magnetic sensor 6, which is disposed in opposition to the magnetic recording medium 4, is so arranged that two magnetic resistance elements $R_1$ and $R_2$ are opposed to the track 4a, that the distance between them is equal to $\lambda/2$, $\lambda$ being the wavelength of the magnetic recording signals, and that the magneto-resistance element $R_3$ is opposed to the track 4b. The magneto-resistance elements $R_1$ to $R_3$ are so formed by evaporation on a glass plate that their resistance is varied by magnetic field which is perpendicular to the direction of electric current. FIG. 4 shows a characteristic curve indicating the relation between the resistance and the magnetic field for a magneto-resistance element made of a ferromagnetic substance such as permalloy.

Figure 5:
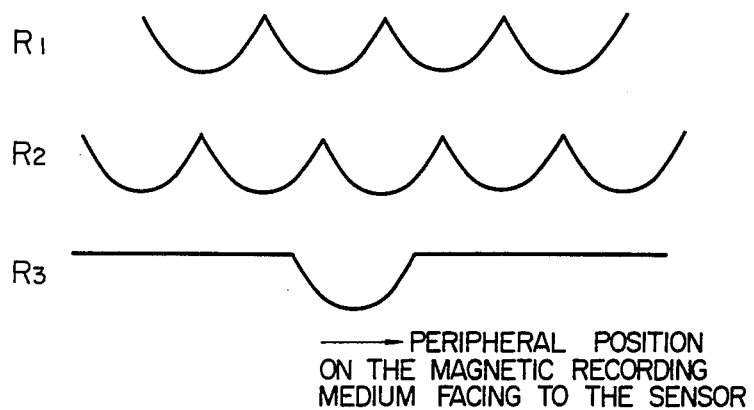
FIG. 5 shows variations in resistance of magneto-resistance elements used in a magnetic rotation sensor according to this invention.

Now, assume that the motor 1 in FIG. 1 rotates. This is equivalent to the fact that the magnetic recording medium 4 moves in the direction of the arrow. When the magnetic recording medium 4 moves, the magneto-resistance elements $R_1$ to $R_3$ are subjected to variations in resistance as indicated in FIG. 5. That is, since the resistances $R_1$ and $R_2$ are separated by $\lambda/2$, the resistance $R_2$ varies with retarded phase with respect to the variations of the resistance $R_1$, as indicated in FIG. 5. Further, since the resistance $R_3$ varies only when the magnetic signal exists, it varies as indicated in the figure.

Figure 6:
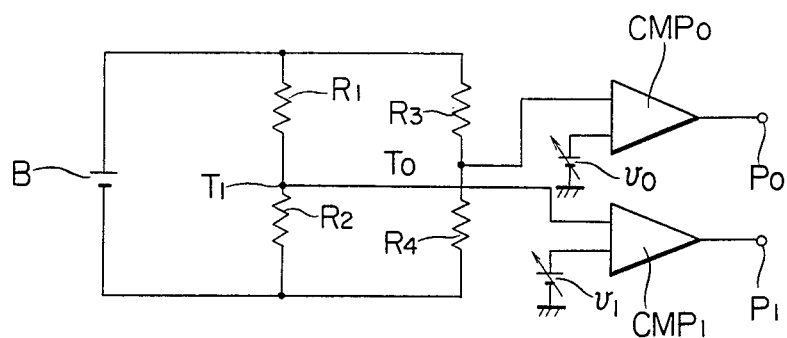
FIG. 6 is a circuit diagram of a connecting circuit and a wave-shaping circuit for the magneto-resistance element according to this invention.
Figure 7:
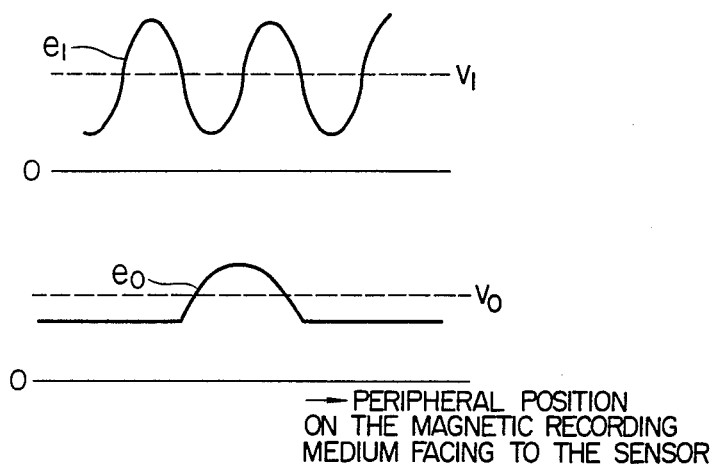
FIG. 7 shows output waveforms of the magnetic sensor according to this invention.
Figure 8:
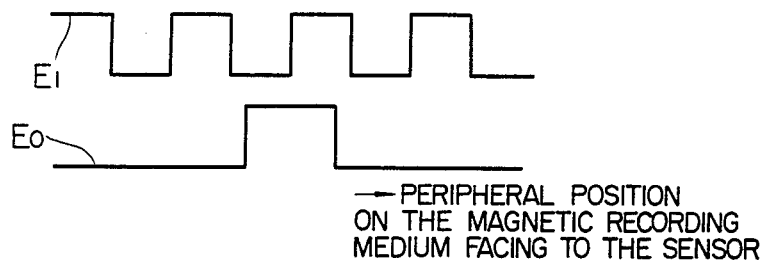
FIG. 8 shows output waveforms of the magnetic rotation sensor according to this invention, which are shaped by the wave-shaping circuit.

Among these magneto-resistance elements the resistances $R_1$ and $R_2$ are connected in series and constitute a three-terminal element, as indicated in FIG. 6. The magneto-resistance $R_3$ is connected in series with a constant resistance $R_4$ and they constitute another three-terminal element. Connecting the terminals of these three-terminal elements to a source B and examining variations in voltage at the two intermediate terminals $T_1$ and $T_0$, voltage waveforms $e_1$ and $e_2$, respectively, as indicated in FIG. 7, are obtained. Outputs at the intermediate terminals are applied to two voltage comparators $CMP_1$ and $CMP_0$, respectively. On the other hand, reference voltages $v_1$ and $v_0$ are applied to the other inputs of the voltage comparators $CMP_1$ and $CMP_0$, respectively, and the output voltages at the intermediate terminals are compared with the reference voltages $v_1$ and $v_0$, respectively, so that each of the comparators $CMP_1$ and $CMP_0$ produces a high level signal when the output $e_1$ or $e_0$ is not less than the respective reference voltage $v_1$ or $v_0$ and a low level signal when the output $e_1$ or $e_0$ is less than the reference voltage $v_1$ or $v_0$. Thus signals $E_1$ and $E_0$ having waveforms as indicated in FIG. 8 are obtained at the outputs of the comparators. The signal $E_0$ is used for determining the reference angular position of the rotary body 1. Any instant angular position of the rotary body 1 can be determined with an error less than the half of the distance $\lambda$ between the poles N and S by counting the number of the signals $E_1$ appearing after occurrence of the signal $E_0$. In this way according to this invention, it is possible to detect magnetic signals by using these magneto-resistance elements without making magnetic signals recorded in different tracks of the magnetic recording medium interfere with each other and furthermore to reduce the size of the magnetic recording medium and the magnetic sensor by making the distance between the tracks of the magnetic recording medium small enough.

Figure 9:
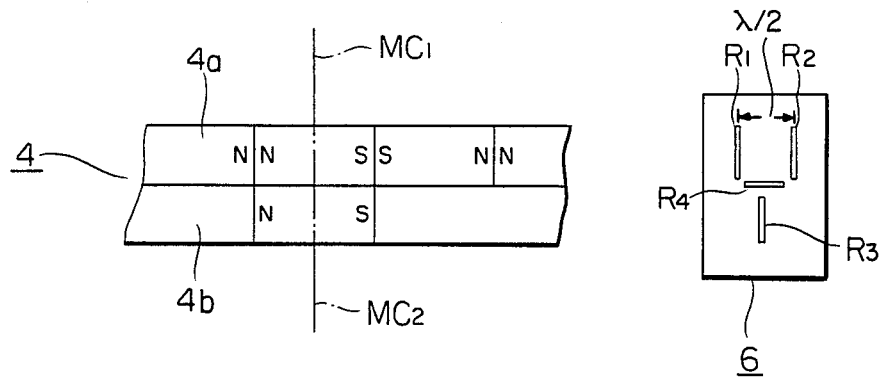
FIG. 9 shows a development of a magnetic sensor and a magnetic recording medium according to another embodiment of this invention.
Figure 10:
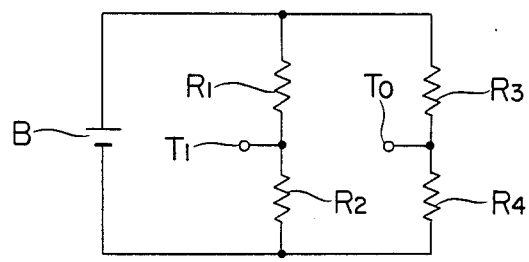
FIG. 10 is a circuit diagram for the magnetic sensor according to this other embodiment of this invention.

Another embodiment of this invention will be explained, referring to FIGS. 9 and 10. In this embodiment, the constant resistance $R_4$, part of a three-terminal element, is formed together with the magneto-resistance elements $R_1$ to $R_3$ on a common substrate so that errors due to temperature variations in the magneto-resistance elements $R_1$ to $R_3$ can be corrected without enlarging the whole size of the magnetic sensor. FIG. 9 shows a development of the magnetic sensor 6 and the magnetic recording medium 4, in which the magnetic recording medium 4 is divided into two tracks 4a and 4b. In the track 4a, magnetic signals are recorded continuously in all around the perimeter. To the contrary, in the track 4b are recorded one or several signals in the perimeter. The magnetic sensor 6 disposed in opposition to the magnetic medium 4 is so arranged that the magneto-resistance elements $R_1$ and $R_2$ are opposed to the track 4a and the magneto-resistance element $R_3$ is opposed to the track 4b. Further, the magneto-resistance element $R_4$ is so disposed in the direction perpendicular to the elements $R_1$ to $R_3$ mentioned above that it is opposed to the boundary between the tracks 4a and 4b. In such a construction, when the magnetic recording medium 4 moves, the resistance of the magneto-resistance elements $R_1$ to $R_3$ varies in the same manner as that in the previous embodiment shown in FIG. 5. Since the magneto-resistance element $R_4$ is disposed so as to be opposed to the boundary between the tracks 4a and 4b and directed in such a manner that it detects magnetic field between the tracks 4a and 4b and since there is no magnetic leakage between the different tracks, it acts as a constant resistance. Moreover, since the magneto-resistance elements $R_3$ and $R_4$ are disposed closely to each other, they vary equally with respect to variations in temperature, and thus errors due to temperature variations can be easily corrected. The outputs at the connection point $T_1$ of the magneto-resistance elements $R_1$ and $R_2$ and the connection point $T_0$ of the magneto-resistance elements $R_3$ and $R_4$ vary as shown in FIG. 7 and they can be wave-shaped as shown in FIG. 8. By arranging these magneto-resistance elements in this way, it is possible to correct errors due to temperature variations for the magneto-resistance element $R_3$.

The magnetic recording medium can be any type of medium such as those having a large number of permanent magnets. Further, the magnetic signals can be recorded not only in the direction of displacement as shown in the preceding embodiments, but also in the direction perpendicular to the direction of displacement or in the direction perpendicular to the surface of the magnetic recording medium according to the so-called vertical recording method.

In short, any type of magnetic recording method can be used, as long as it is possible to record the magnetic signals in such a manner that the position and the direction of those recorded in different tracks, which are adjacent to each other, coincide to each other.

The magnetic recording medium can move linearly, too. That is, the rotary body mentioned in the preceding embodiments can be replaced by a linearly moving body or in other terms by a moving body.

The number of tracks can be arbitrary as long as they are plural. With increasing number of tracks, the effect of this invention that the size of the magnetic sensor and the magnetic recording medium can be reduced becomes more eminent.

As explained above, according to this invention, magnetic signals can be detected correctly by using magneto-resistance elements without being subjected to magnetic interference between magnetic signals recorded in different tracks, even if the tracks are disposed closely in the magnetic recording medium.

We claim:

1. A device for magnetically detecting displacement of a non-magnetic movable member comprising a magnetic recording medium carried on the movable member, at least first and second tracks provided on the magnetic recording medium and juxtaposed to each other, the first track having a plurality of first magnetic signals recorded on a given length of the first track, each of the first magnetic signals including a pair of N and S poles and arranged so that the N and S poles are disposed alternately at uniform intervals along the first track, the second track having only one second magnetic signal recorded on a length of the second track juxtaposed to the given length of the first track, the second magnetic signal including a pair of N and S poles which are respectively aligned with the N and S poles of one of the first magnetic signals recorded on the given length of the first track in a direction perpendicular to the moving direction of the movable member so as to enable prevention of magnetic leakage between the respective tracks, and magneto-resistance element means fixedly disposed adjacent to the movable member and including first and second magneto-resistance element sets facing the first and second tracks, respectively, for producing electrical signals representing variations of resistance of the first and second magneto-resistance element sets, respectively, in response to the first and second magnetic signals recorded on the respective tracks when the movable member moves so as to enable determination of the displacement of the movable member in accordance with the electrical signals produced.

2. A device according to claim 1, wherein the first magneto-resistance element set includes two magneto-resistance elements which are separated from each other by a distance equal to one-half of the uniform interval between the N and S poles of each first magnetic signal recorded on the first track.

3. A device according to claim 1, wherein the second magneto-resistance element set includes one magneto-resistance element associated with and facing the second track, and the magneto-resistance element means includes another magneto-resistance element disposed so as to face the boundary between the first and second tracks.

4. A device according to claim 3, wherein the another magneto-resistance element has a constant magneto-resistance and extends in the moving direction of the movable member.

* * * * *